United States Patent [19]

Nakamura et al.

[11] Patent Number: 5,914,357
[45] Date of Patent: Jun. 22, 1999

[54] HYDROLYZABLE RESIN CONTAINING ALDEHYDE BOUNDED THERETO AND SELF-POLISHING ANTIFOULING PAINT

[75] Inventors: Isao Nakamura, Uji; Naoki Yamamori, Tsuzuki-gun, both of Japan

[73] Assignee: Nippon Paint Co., Ltd., Japan

[21] Appl. No.: 09/029,826

[22] PCT Filed: Sep. 6, 1996

[86] PCT No.: PCT/JP96/02555

§ 371 Date: Mar. 9, 1998

§ 102(e) Date: Mar. 9, 1998

[87] PCT Pub. No.: WO97/09356

PCT Pub. Date: Mar. 13, 1997

[30] Foreign Application Priority Data

Sep. 8, 1995 [JP] Japan .................................... 7/256931

[51] Int. Cl.$^6$ .......................... C09J 201/02; C08F 16/38
[52] U.S. Cl. ....................... 523/177; 523/122; 525/328.7; 526/315

[58] Field of Search .............................. 523/177; 528/246, 528/267, 269; 526/315; 525/328.7

[56] References Cited

U.S. PATENT DOCUMENTS

| 3,177,171 | 4/1965 | Gruber et al. | 526/315 |
| 4,178,430 | 12/1979 | Bilow | 528/269 |

FOREIGN PATENT DOCUMENTS

| 63-23906 | 2/1988 | Japan . |
| 4-132716 | 5/1992 | Japan . |

*Primary Examiner*—Tae Yoon
*Attorney, Agent, or Firm*—Millen, White, Zelano, & Branigan, P.C.

[57] ABSTRACT

As a vehicle resin used for self-polishing antifouling paints, a vinyl polymer having a plurality of primary amino groups in the form of Schiff base in the molecule is used. The films of an antifouling paint containing this vehicle resin gradually release an aldehyde exhibiting antifouling activity from the Schiff base group upon hydrolysis with sea water, while the film gradually dissolves from the surface.

13 Claims, No Drawings

HYDROLYZABLE RESIN CONTAINING ALDEHYDE BOUNDED THERETO AND SELF-POLISHING ANTIFOULING PAINT

BACKGROUND ART

This invention relates to a hydrolyzable resin for use as a vehicle resin of antifouling paints as well as antifouling paints containing said resin.

Antifouling paints containing as a vehicle resin a trialkyltin-containing polymer are known. These resins are advantageous in controlling the release of antifouling agent to a minimum level sufficient to maintain desired antifouling effect at a constant level for a long period of time. In application, the vehicle resin consisting of a trialkyltin-containing polymer is hydrolyzed by the action of weakly alkaline sea water to release the trialkyltin, and at the same time the resin becomes water-soluble so that the paint film is consumed and smoothed. This contributes to the reduction of the frictional resistance of ships against water and, therefore, to the reduction of fuel cost.

The vehicle resins of this type of paints, known as "self-polishing paints", typically consist of copolymers of trialkyltin (meth)acrylate. However, strong concern about the toxic effect of trialkyltin on the ecological system has led to a demand for a new vehicle resin of self-polishing antifouling paints which may replace the trialkyltin-containing polymers.

Most of vehicle resins for self-polishing paints known in the prior art release a metal compound or ion. Recently we have found that some aldehyde compounds such as benzaldehyde or derivatives thereof exhibit an antifouling activity on a variety of aquatic organisms adhering to ships.

It is, therefore, a principal object of the invention to provide a new type of vehicle resins for use in antifouling paint which release upon hydrolysis an antifouling aldehyde in a controlled manner while the remaining hydrolyzed resin is gradually consumed by dissolving in water.

DISCLOSURE OF THE INVENTION

It is well-known in the organic chemistry that an primary amine reacts with an aldehyde to form a Schiff base. The present invention utilizes this reaction to bind the aldehyde to the vehicle resin in a hydrolyzable form.

According to the present invention, there is provided a vehicle resin for use in antifouling paints comprising a vinyl polymer having a plurality of primary amino groups in the form of a Schiff base in the molecule. The resin having a plurality of primary amino groups in the form of a Schiff base may be produced by reacting an aldehyde with the corresponding vinyl polymer having a plurality of primary amino groups. Alternatively, the vinyl polymer Schiff base may be produced by reacting a primary amine monomer with an aldehyde and then copolymering the resulting monomer with other comonomers.

DESCRIPTION OF THE PREFERRED EMBODIMENTS

The first method for producing the vinyl polymer having a plurality of primary amino groups in the form of a Schiff base in the molecule comprises reacting an aldehyde with the corresponding vinyl polymer having primary amino groups. The vinyl polymer having primary amino groups may be produced, in turn, by copolymerizing a primary amine monomer-acid addition salt such as allylamine hydrochloride or 2-aminoethyl (meth)acrylate hydrochloride with other comonomers and then treating the resulting polymer with an alkali to regenerate the primary amine function. We have found that when using aminostyrenes (o-, m- and p-) as the primary amine monomer, the primary amino group-containing vinyl polymer can be directly produced by the copolymerization method.

The above-mentioned primary amine monomers are examples of those monomers producing a vinyl polymer having the primary amino group at the end of pendant groups thereof. Polymers having primary amino groups which are directly attached to the polymer backbone chain, i.e. polymers comprising a number of recurring units corresponding to vinylamine which does not occur as an isolated monomer may also be produced by using N-vinylacrylamide as a starting monomer. Since the acrylolyl double bond is relatively less reactive than the vinyl double bond, this monomer acts as a monofunctional monomer under certain conditions to produce vinyl polymers having N-acryloylamino pendant groups. Primary amino groups may be regenerated by removing acryloyl groups from the resulting polymer by hydrolysis.

Another method for producing the vinyl polymer Schiff base comprises reacting an aldehyde with a primary amine monomer such as allylamine, 2-aminoethyl methacrylate or aminostyrene and then copolymering the resulting Schiff base monomer with other comonomers.

Examples of copolymerizable monomers used in either one of the above methods include alkyl (meth)acrylates such as methyl-, ethyl-, n-propyl-, n-butyl-, t-butyl- or 2-ethylhexyl (meth)acrylate, and/or other monomers such as styrene, a -methylstyrene, vinyltoluene, (meth)acrylamide, (meth)acrylonitrile, vinyl acetate, vinyl propionate or vinyl chloride. A small proportion of hydroxyl group-containing acrylic monomers such as 2-hydroxylethyl (meth) acrylate or 2-hydroxypropyl (meth)acrylate may be copolymerized.

A variety of aldehydes may be used to form a Schiff base by the reaction with the primary amino group of the vinyl polymers or monomers. Formaldehyde is known to have a strong biocidal activity as well as dialdehydes such as glyoxal, succinaldehyde or glutaraldehyde. Therefore, aliphatic aldehydes including the above-mentioned mono- and dialhydes may generally be selected. We have found that certain aldehydes having no or decreased biocidal activity also exhibit antifouling activity against aquatic organisms adhering to marine structures. Examples of these aldehydes include benzaldehyde, substituted benzaldehydes such as p-n-hexylbenzaldehyde, p-octylbenzaldehyde, p-oleylbenzaldehyde, vanillin or piperonal; aromatic aldehyde such as cinnamaldehyde; and saturated or unsaturated aliphatic aldehydes having 6 or more carbon atoms such as capronaldehyde, caprylaldehyde, caprinaldehyde, laurylaldehyde, stearylaldehyde or oleylaldehyde. Benzaldehyde, substituted benzaldehydes and saturated or unsaturated alphatic mnoaldehydes having 6 or more carbon atoms are preferred in terms of easy handling and long lasting antifouling activity.

The reaction between the aldehyde and the primary amine monomer or primary amine vinyl polymer may be carried out, as is conventional, under such conditions that water produced as a reaction by-product may be removed from the reaction system.

The vinyl polymers having primary amino groups in the form of Schiff base preferably have a number average molecular weight from 2,000 to 100,000, more preferably from 5,000 to 40,000. The molecular weight within the above range is necessary for maintaining an optimal balance among the film-forming property, workability and dissolution rate. The vinyl polymers preferably contain the primary amino groups in the form of Schiff base at a concentration from 0.01 to 1.5 mol/100 g, more preferably from 0.1 to 1.0 mol/100 g.

The above-mentioned aldehydes having antifouling activity may be incorporated to the antifouling paint of the present invention as a discrete component. In this case, an aromatic primary amine such as aniline or substituted anilines may also be combined as a discrete component or in the form of Schiff base with the aldehyde.

The vinyl polymers having primary amino groups in the form of Schiff base may be incorporated into self-polishing antifouling paint formulations in combination with an antifouling agent and other conventional additives.

The antifouling paint composition according to the present invention may contain the following conventional additives.

(1) Antifouling agent:

Powders or flakes of copper, zinc and nickel; oxides, hydroxides, halides or other salts of copper and zinc, particularly cuprous oxide or copper rhodanide; biocidal metal carboxylates such as copper naphenate or copper stearate; metal (e.g. Na, K, Zn, Pb, Cu, Fe, Ni, Mg, Se) dithiocarbamates such as zinc dimethyldithiocarbamate, zinc bis-(dimethyldithiocarbamate) or zinc ethylenebis-dithiocarbamate; thiuram disulfides such as tetramethylthiurum disulfide; sulfamides such as phthalysulfathiazole, sulfaethyldole, sulfanilidopyridine, sulfamethoxyine or N,N'-dimethyl-N'-phenyl-N-fluorodichloromethylthiosulfamide; pyrrole and imidazole compounds such as glyodine, fentizole or polycide; thioxane and thioxathone compounds such as tetrazol, asterol or mylone; imide and amide compounds such as nicarbazin, 3,4,5-tribromosalicylanilide, N-trichloromethyl-mercaptophthalimide, 3,5-dinitrobenzamide, 2,4,6-trichloromaleimide or N-fluorodichloromethylthiophtha limide; sulfur- or halogen-containing organic compounds such as 2-methylthio-4-t-butylamino-6-cyclopropylamino-s-triazine, 2,4,5,6-tetrachlorophthalonitrile, N,N'-dimethyl-N-dichlorophenylurea, 4,5-dichloro-2-n-octyl-3-(2H) isothiazoline, 2-pyridinethiol-1-oxide zinc, 2,3,5,6-tetrachloro-4-methylsulfonyl-pyridine, 3-iode-2-propylbutylcarbamate or diiodomethyl p-tolylsulfone; and other known antifouling agents, pesticides, bacteriocides and fungicides.

(2) Plasticizer;

Phthalate plasticizers such as dioctyl phthalate, dimethyl phthalate or dicyclohexyl phthalate; aliphatic dicarboxylate plasticizers such as diisobutyl adipate or butyl sebacate; glycol ester plasticizers such as diethylene glycol dibenzoate or pentaerythritol alkanoic etser; phosphate plasticizers such as tricresyl phosphate or trichloroethyl phosphate; epoxy plasticizers such as epoxydized soybean oil or epoxydized octyl stearate; organotin plasticizers such as dioctyltin dilaurate or dibutyltin dilaurate; and other plasticizers such as trioctyl trimellitate or triacetin.

(3) Film consumption regulator:

Chlorinated paraffin, polyvinyl ether, polypropylene sebacate, partially hydrogenated terphenyl, polyvinyl acetate, polyalkyl (meth)acrylate, polyether polyol, alkyd resin, polyester resin, polyvinyl chloride, silicone oil, wax, vaseline and liquid paraffin.

(4) Pigment:

Extender pigments such as precipitated barium sulfate, talc, clay, chalk, silica white, alumina white or bentonite; color pigments such as titanium dioxide, zirconium dioxide, basic lead sulfate, tin oxide, carbon black, graphite, red iron oxide, chromium yellow, emerald green, phthalocyanine blue or quinacridone.

(5) Solvent:

Hydrocarbons such as xylene, toluene, ethylbenzene, cyclopentane, octane, heptane, cyclohexane or white spirit; ethers such as dioxane, tetrahydrofuran, ethylene glycol monomethyl ether, ethylene glycol monoethyl ether, ethylene glycol dimethyl ether, ethylene glycol monobutyl ether, ethylene glycol dibutyl ether, diethylene glycol monomethyl ether or diethylene glycol monoethyl ether; esters such as butyl acetate, propyl acetate, benzyl acetate, ethylene glycol monomethyl ether acetate or ethylene glycol monoethyl ether acetate; ketones such as methyl isobutyl ketone or ethyl isobutyl ketone; and alcohols such as n-butanol or propyl alcohol.

(6) Other additives:

Monobasic organic acids such as rosin, monobutyl phthalate or monooctyl succinate; camphor and castor oil.

The antifouling paint composition of the present invention may be prepared by the method known per se in the art. Any known machine such as ball mills, pebble mills, roll mills or sand grind mills may be used for mixing various ingredients.

Paint films of the antifouling paint of the present invention applied on ships, fish nets or marine structurals will be gradually hydrolyzed and disolved in the weakly alkaline atmosphere of sea water. It is believed that the dissolution mechanism of the paint films is such that, rather than the decomposition of the vehicle resin into a large number of small segment by hydrolysis, pendant groups are converted into a hydrophilic group upon hydrolysis until the concentration or density thereof reaches a threshold level at which the resin begins to dissolve. Accordingly, the antifouling paint of the present invention may produce, when applied onto ships, a film having excellent performance in terms of controlled antifouling effect for a long period of time. Thus, the antifouling paint of the invention finds use in ships such as tankers, ferry boats, fishing boats, steel boats, wood boats and FRP boats but also marine stracturals, fish nets and sea water conduits.

In the following production examples, examples and comparative examples, all parts and percents are by weight unless otherwise indicated.

PRODUCTION OF VEHICLE RESIN

PRODUCTION EXAMPLE 1

Into a flask equipped with a stirrer, nitrogen gas tube and drip funnel were placed 95 parts of xylene and heated to 80° C. To this was added dropwise a mixture of 42 parts of p-aminostyrene, 42 parts of methyl methacrylate, 22 parts of n-butyl methacrylate and 1.5 parts of 2,2'-azobisisobutyronitrile over 4 hours. After 30 minutes, a solution of 0.3 parts of 2,2'-azobisisobutyronitrile in 5 parts of n-butanol was added dropwise over 30 minutes and then the reaction mixture maintained at 80° C. for additional 90 minutes. The resulting varnish termed "Varnish A" has a primary amino concentration of 0.15 mol/100 g.

PRODUCTION EXAMPLE 2

Into the same flask as used in Production Example 1 were placed 98 parts of xylene and maintained at 0° C. To this was added 36 parts of p-aminostyrene and 66 parts of p-octylbenzaldehyde. The mixture was maintained at 0° C. for 2 hours and then heated to 40° C. for 2 hours while removing formed water in vacuo at about 250 Pa. Monomer Solution A containing 4-(4-octylbenzylidene)iminostyrene was obtained.

PRODUCTION EXAMPLE 3

Into the same flask as used in Production Example 1 were placed 95 parts of xylene and maintained at 100° C. To this was added dropwise a mixture of 45 parts of Monomer Solution A, 45 parts of methyl methacrylate and 1.3 parts of 2,2'-azobisbutyronitrile over 4 hours. After 30 minutes, a solution of 0.2 parts of 2,2'-azobisisobutyronitrile in 5 parts of xylene was added dropwise over 30 minutes and the reaction mixture maintained at the same temperature for 90 minutes to obtain Varnish C.

PRODUCTION EXAMPLE 4

Into the same flask as used in Production Example 1 were placed 95 parts of xylene and maintained at 100° C. To this was added dropwise a mixture of 55 parts of Monomer Solution A, 35 parts of methyl methacrylate and 5 parts of styrene, 5 parts of vinyl acetate and 1.3 parts of 2,2'-azobisisobutyronitrile over 4 hours. After 30 minutes, a solution of 0.2 parts of 2,2'-azobisisobutyronitrile in 5 parts of xylene was added dropwise over 30 minutes and the reaction mixture maintained at the same temperature for 90 minutes to obtain Varnish D.

PRODUCTION EXAMPLE 5

Into the same flask as used in Production Example 1 were placed 95 parts of xylene and maintained at 100° C. To this was added dropwise a mixture of 35 parts of N-vinylacrylamide, 45 parts of methyl methacrylate, 20 parts of styrene and 1.3 parts of 2,2'-azobisisobutyronitrile over 4 hours. After 30 minutes, a solution of 0.2 parts of 2,2'-azobisisobutyronitrile in 5 parts of xylene was added dropwise over 30 minutes and the reaction mixture maintained at the same temperature for 90 minutes. The resulting polymer solution was then cooled to room temperature, mixed with 500 parts of 1N sodium hydroxide and stirred for 2 hours. After removing aqueous phase by decanting, the organic phase was wash twice with deionized water and the remaining water was distilled off azeotropically with xylene in vacuo at about 150 Pa. Varnish B having a primary amino concentration of 0.25 mol/100 g was obtained.

PRODUCTION EXAMPLE 6

A flask equipped with a stirrer, nitrogen gas tube and decanter was charged with 100 parts of Varnish A and 30 parts of p-hexylbenzaldehyde. Then the mixture was heated at a reflux temperature of about 130° C. for 3 hours while distilling off water formed by the reaction to produce Varnish A.

PRODUCTION EXAMPLE 7

The same flask as used in Production Example 6 was charged with 100 parts of Varnish B and 26 parts of benzaldehyde. Then the mixture was heated at a reflux temperature of about 130° C. for 3 hours while distilling off by-produced water to produce Varnish F.

PRODUCTION EXAMPLE 8

The same flask as used in Production Example 6 was charged with 100 parts of Varnish B and 38 parts of vanilline. Then the mixture was heated to reflux temperature of about 130 ° C. for 3 hours while distilling off by-produced water to produce Varnish G.

PRODUCTION EXAMPLE 9

The same flask as used in Production Example 6 was charged with 100 parts of Varnish B and 90 parts of p-oleylbenzaldehyde. Then the mixture was heated at reflux temperature of about 130° C. for 3 hours while distilling off by-produced water to produce Varnish H.

PRODUCTION EXAMPLE 10

The same flask as used in Production Example 6 was charged with 100 parts of Varnish B and 70 parts of oleylaldehyde. Then the mixture was heated at reflux temperature of about 130° C. for 3 hours while distilling off by-produced water to produce Varnish I.

PRODUCTION EXAMPLE 11

The same flask as used in Production Example 1 was charged with 70 parts of xylene and 20 parts of n-butanol and heated to an inner temperature of 100 ° C. To this was added dropwise a mixture of 75 parts of 2-aminoethyl methacrylate and 25 parts of 2,2'-azobisisobutyronitrile over 3 hours. After 30 minutes, a solution of 0.3 parts of 2,2'-azobisisobutyronitrile in 5 parts of xylene was added and the reaction mixture maintained at the same temperature for 2 hours. Then, 85 parts of piperonal were added to the flask followed by heating the mixture to reflux while distilling off by-produced water. A varnish termed "Varnish J" was thus produced.

PAINT FORMULATION

EXAMPLES 1–20 AND COMPARATIVE EXAMPLES 1–4

Materials shown in Table 1 and Table 2 were thoroughly mixed in a disperser to obtain paints for testing.

TABLE 1

| Material, parts | EXAMPLE | | | | | | | | |
|---|---|---|---|---|---|---|---|---|---|
| | 1 | 2 | 3 | 4 | 5 | 6 | 7 | 8 | 9 |
| Varnish C | 75 | | | | | | | | |
| Varnish D | | 80 | | 65 | | | | | |
| Varnish E | | | 70 | | | | | | |
| Varnish F | | | | | 65 | | | | |
| Varnish G | | | | | | 70 | 80 | | |
| Varnish H | | | | | | | | 65 | |
| Varnish I | | | | | | | | | 65 |
| Cu phthalocyanine | | | 7 | | | 7 | 8 | | 7 |
| red iron oxide | | | | | 8 | | | 8 | |
| TiO$_2$ | | | | 3 | | | 2 | 2 | |
| talc | | | | | 8 | 3 | | | |
| caprylaldehyde | | | | | | 12 | | | |
| benzylideneaniline | | | | | 12 | | | | |
| octylaniline | | | | 25 | | | | 10 | 15 |
| colloidal silica | 4 | 4 | 3 | | 4 | 4 | 3 | 4 | 4 |
| n-butanol | 4 | 4 | 3 | 4 | 3 | 4 | 4 | 4 | 4 |
| xylene | 17 | 12 | 14 | 6 | | | 3 | 9 | 5 |

| Material, parts | EXAMPLES | | | | | | | | | | |
|---|---|---|---|---|---|---|---|---|---|---|---|
| | 10 | 11 | 12 | 13 | 14 | 15 | 16 | 17 | 18 | 19 | 20 |
| Varnish C | 40 | | | | | | | | | | |
| Varnish D | | 35 | | | | | | | | | |
| Varnish E | | | 45 | | | | | | | | |

TABLE 1-continued

| | | | | | | | | | | |
|---|---|---|---|---|---|---|---|---|---|---|
| Varnish F | | | | | 30 | | | | | |
| Varnish G | | | | 40 | | | 50 | | | |
| Varnish H | | | | | | 55 | | | | 35 |
| Varnish I | | | | | | | 35 | | | |
| Varnish J | 45 | | | | | | | | 30 | |
| Cu phthalo-cyanine | | 8 | 7 | 8 | | | | | 7 | |
| red iron oxide | 25 | | | 7 | | 6 | | | | |
| TiO$_2$ | 10 | 7 | 5 | 5 | | 5 | | | 5 | 5 |
| CuO | | | | | 20 | 8 | 20 | 25 | 25 | 15 |
| ZnO | | 15 | 15 | | | 15 | 5 | 5 | 7 | 3 | 15 |
| talc | | | 5 | 5 | 5 | 5 | | 5 | 5 | 2 | 5 |
| others[1)–6)] | | 5 | 2 | 5,3 | 5 | 3 | 3 | 3 | 3,3,2 | |
| caprylaldehyde | | | | | | 6 | | | | |
| octylaniline | | | 8 | | 8 | | 5 | | | 2 |
| benzylidene-aniline | | | | 5 | 10 | | | 4 | | |
| DOP | | 5 | 5 | 5 | | 5 | | 5 | 4 | 3 | 5 |
| colloidal silica | 5 | 3 | 4 | 4 | 4 | 4 | 3 | 3 | 4 | 3 | 3 |
| n-butanol | 5 | 3 | 4 | 3 | 5 | 4 | 3 | 3 | 4 | 3 | 3 |
| xylene | 10 | 14 | 10 | 12 | 7 | 8 | | 5 | 14 | 26 | 12 |

Remarks in Table 1
[1)] 2,4,6-trichlorophenylmaleimide in Ex. 11 and 15.
[2)] diiodomethyl p-tolyl sulfone in Ex. 12 and 14.
[3)] zinc 2-pyridinethiol-1-oxide in Ex. 16.
[4)] N,N'-dimethyldichlorophenylurea in Ex. 16
[5)] 5 parts of 1) and 3 parts of 3) in Ex. 13.
[6)] 3 parts of 1), 3 parts of 3) and 2 parts of 4) in Ex. 18.

TABLE 2

| | COMPARATIVE EXAMPLES | | | |
|---|---|---|---|---|
| Material, parts | 1 | 2 | 3 | 4 |
| chlorinated rubber | 40 | 25 | 15 | |
| organotin copolymer[1)] | | | | 40 |
| TiO$_2$ | | 5 | 5 | 5 |
| CuO | | 15 | 20 | 15 |
| ZnO | | 5 | 5 | 5 |
| talc | | | | 5 |
| WW rosin | | 5 | 15 | |
| DOP | | 3 | 3 | 5 |
| colloidal silica | 3 | 3 | 4 | 3 |
| n-butanol | 2 | 3 | 3 | 3 |
| xylene | 55 | 34 | 30 | 19 |

[1)] tributyltin methacrylate(55)-methyl methacrylate (45) copolymer, 50% solution in xylene.

EXAMPLES 21–28

Varnish C-Varnish J as produced were used in these examples.

ANTIFOULING TEST

Coating composition of Examples 1–20 and Comparative Examples 1–4 were each applied on a steel plate (9×28 cm size) to a dry film thickness of about 150 microns. The substrate steel plate had been previously surface treated with sand blasting and then coated with a coaltar-epoxy primer.

Coating compositions of Examples 21–28 (Varnish C-Varnish J) were applied on a polyvinyl chloride plate (9×28 cm size) to a dry film thickness of about 100 microns.

The resulting specimens were soaked in the sea near Research Laboratories of Nippon Paint Co. Ltd. at Tamano, Okayama, Japan. The antifouling property of these specimens were evaluated in terms of % fouled area with marine organisms with time. The results are shown in Table 3.

TABLE 3

Antifouling Test

| | Time, month | | | | | | | |
|---|---|---|---|---|---|---|---|---|
| Exam. | 1 | 3 | 6 | 12 | 18 | 24 | 30 | 36 |
| 1 | 0 | 0 | 0 | 0 | 0 | 0 | 0 | 0 |
| 2 | 0 | 0 | 0 | 0 | 0 | 0 | 0 | 0 |
| 3 | 0 | 0 | 0 | 0 | 0 | a | 0 | 0 |
| 4 | 0 | 0 | 0 | 0 | 0 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |
| 8 | 0 | 0 | 0 | 0 | 0 | 0 | 0 | 0 |
| 9 | 0 | 0 | 0 | 0 | 0 | 0 | 0 | 0 |
| 10 | 0 | 0 | 0 | 0 | 0 | 0 | 0 | 0 |
| 11 | 0 | 0 | 0 | 0 | 0 | 0 | 0 | 0 |
| 12 | 0 | 0 | 0 | 0 | 0 | 0 | 0 | 5 |
| 13 | 0 | 0 | 0 | 0 | 0 | 0 | 0 | 0 |
| 14 | 0 | 0 | 0 | 0 | 0 | 0 | 0 | 0 |
| 15 | 0 | 0 | 0 | 0 | 0 | 0 | 0 | 0 |
| 16 | 0 | 0 | 0 | 0 | 0 | 0 | 0 | 0 |
| 17 | 0 | 0 | 0 | 0 | 0 | 0 | 0 | 0 |
| 18 | 0 | 0 | 0 | 0 | 0 | 0 | 0 | 0 |
| 19 | 0 | 0 | 0 | 0 | 0 | 0 | 0 | 0 |
| 20 | 0 | 0 | 0 | 0 | 0 | 0 | 0 | 0 |
| Comp. 1 | 30 | 100 | 100 | 100 | 100 | 100 | 100 | 100 |
| Comp. 2 | 5 | 30 | 70 | 100 | 100 | 100 | 100 | 100 |
| Comp. 3 | 10 | 40 | 80 | 100 | 100 | 100 | 100 | 100 |
| Comp. 4 | 0 | 0 | 0 | 0 | 0 | 0 | 0 | 0 |

| | Time, month | | | | | | | |
|---|---|---|---|---|---|---|---|---|
| Example | 1 | 3 | 6 | 12 | 18 | 24 | 39 | 36 |
| 21 | 0 | 0 | 0 | 0 | 0 | 0 | 0 | 0 |
| 22 | 0 | 0 | 0 | 0 | 0 | 0 | 0 | 0 |
| 23 | 0 | 0 | 0 | 0 | 0 | 0 | 0 | 5 |
| 24 | 0 | 0 | 0 | 0 | 0 | 0 | 0 | 0 |
| 25 | 0 | 0 | 0 | 0 | 0 | 0 | 0 | 0 |
| 26 | 0 | 0 | 0 | 0 | 0 | 0 | 0 | 0 |
| 27 | 0 | 0 | 0 | 0 | 0 | 0 | 0 | 5 |
| 28 | 0 | 0 | 0 | 0 | 0 | 0 | 0 | 0 |

FILM CONSUMPTION TEST

Coating compositions of Examples and Comparative Examples were each applied on an acrylic resin disc having a diameter of 35 cm to a dry film thickness of about 100 microns. Then the coated discs were continuously rotated in the sea water at 18–23° C. for 12 months at a circumfential speed of 25 knots. The film consumption rate was evaluated in terms of the difference between the initial film thickness and the remaining film thickness with time. The results are shown in Table. 4.

TABLE 4

Film Consumption Test

| | Consumed film thickness, $\mu$m | | | |
|---|---|---|---|---|
| Exam. | 1 mon. | 3 mon. | 6 mon. | 12 mon. |
| 1 | 12 | 26 | 42 | 68 |
| 2 | 10 | 22 | 34 | 50 |
| 3 | 12 | 24 | 40 | 64 |
| 4 | 15 | 23 | 42 | 61 |
| 5 | 14 | 22 | 41 | 75 |
| 6 | 12 | 24 | 38 | 61 |
| 7 | 13 | 20 | 32 | 52 |
| 8 | 11 | 22 | 34 | 55 |
| 9 | 11 | 20 | 32 | 50 |
| 10 | 14 | 24 | 45 | 67 |

TABLE 4-continued

Film Consumption Test

Consumed film thickness, μm

| Exam. | 1 mon. | 3 mon. | 6 mon. | 12 mon. |
|---|---|---|---|---|
| 11 | 11 | 21 | 36 | 58 |
| 12 | 5 | 12 | 21 | 34 |
| 13 | 13 | 22 | 36 | 54 |
| 14 | 11 | 19 | 28 | 44 |
| 15 | 13 | 24 | 42 | 51 |
| 16 | 8 | 13 | 23 | 34 |
| 17 | 12 | 20 | 32 | 51 |
| 18 | 9 | 16 | 27 | 43 |
| 19 | 12 | 19 | 33 | 52 |
| 20 | 12 | 18 | 34 | 48 |
| 21 | 7 | 14 | 21 | 32 |
| 22 | 8 | 11 | 18 | 26 |
| 23 | <5 | 6 | 8 | 14 |
| 24 | 6 | 9 | 11 | 16 |
| 25 | 7 | 10 | 14 | 22 |
| 26 | 8 | 10 | 14 | 21 |
| 27 | 6 | 7 | 10 | 16 |
| 28 | 7 | 11 | 13 | 19 |
| Comp. 1 | <5 | <5 | <5 | <5 |
| Comp. 2 | <5 | <5 | <5 | <5 |
| Comp. 3 | 5 | 20 | no film | |
| Comp. 4 | 12 | 22 | 38 | 69 |

The above test results demonstrate that the resin and antifouling paint of the present invention exhibited satisfactory self-polishing performance which is comparable to that of the organotin polymer-based paint of Comparative Example 4.

We claim:

1. A vehicle resin for antifouling paint comprising a vinyl polymer having a plurality of primary amino groups in the form of Schiff base in the molecule.

2. A self-polishing antifouling paint comprising a vehicle resin of claim 1.

3. The vehicle resin of claim 2 wherein the aldehyde which forms the Schiff base with said primary amino group is an aromatic aldehyde.

4. The vehicle resin of claim 3 wherein said aromatic aldehyde is benzaldehyde, p-n-hexylbenzaldehyde, p-octylbenzaldehyde, p-oleylbenzaldehyde, vanilline, piperonal or cinnamaldehyde.

5. The vehicle resin of claim 2 wherein the aldehyde which forms the Schiff base with said primary amino group is an aliphatic aldehyde having 6 or more carbon atoms.

6. The vehicle resin of claim 5 wherein said aliphatic aldehyde is capronaldehyde, caprylaldehyde, laurylaldehyde, stearylaldehyde or oleylaldehyde.

7. The vehicle resin of claim 2 wherein said vinyl polymer is produced by reacting an aldehyde with a corresponding vinyl polymer having primary amino groups.

8. The vehicle resin of claim 7 wherein said vinyl polymer having primary amino groups comprises a recurring unit of vinylamine, allylamine, 2-aminoethyl (meth)acrylate or aminostyrene.

9. The vehicle resin of claim 2 comprising a copolymer of a monomer having a primary amino group in the form of Schiff base and a vinyl monomer copolymerizable therewith.

10. The vehicle resin of claim 9 wherein said primary amino group-containing monomer is allyamine, 2-aminoethyl (meth)acrylate or aminostyrene.

11. The vehicle resin of claim 2 having a number molecular weight from 2,000 to 100,000.

12. The vehicle resin of claim 2 having a Schiff base group molar concentration of from 0.01 to 1.5 mol/100 g.

13. A self-polishing antifouling paint comprising the vehicle resin of one of claim 1, at least one of antifouling agents and an organic solvent.

* * * * *

UNITED STATES PATENT AND TRADEMARK OFFICE
CERTIFICATE OF CORRECTION

PATENT NO. : 5,914,357
DATED : June 22, 1999
INVENTOR(S) : Isao NAKAMURA et al.

It is certified that error appears in the above-identified patent and that said Letters Patent is hereby corrected as shown below:

Claim 3, line 1: Delete "vehicle resin" and insert -- self-polishing, anti-fouling paint -- therefor.

Claim 4, line 1: Delete "vehicle resin" and insert -- self-polishing, anti-fouling paint -- therefor.

Claim 5, line 1: Delete "vehicle resin" and insert -- self-polishing, anti-fouling paint -- therefor.

Claim 6, line 1: Delete "vehicle resin" and insert -- self-polishing, anti-fouling paint -- therefor.

Claim 7, line 1: Delete "vehicle resin" and insert -- self-polishing, anti-fouling paint -- therefor.

Claim 8, line 1: Delete "vehicle resin" and insert -- self-polishing, anti-fouling paint -- therefor.

Claim 9, line 1: Delete "vehicle resin" and insert -- self-polishing, anti-fouling paint -- therefor.

Claim 10, line 1: Delete "vehicle resin" and insert -- self-polishing, anti-fouling paint -- therefor.

Claim 11, line 1: Delete "vehicle resin" and insert -- self-polishing, anti-fouling paint -- therefor.

UNITED STATES PATENT AND TRADEMARK OFFICE
CERTIFICATE OF CORRECTION

PATENT NO. : 5,914,357
DATED : June 22, 1999
INVENTOR(S) : Isao NAKAMURA et al.

It is certified that error appears in the above-identified patent and that said Letters Patent is hereby corrected as shown below:

Claim 12, line 1: Delete "vehicle resin" and insert -- self-polishing, anti-fouling paint -- therefor.

Claim 13, line 2: Delete "one of".

Signed and Sealed this

Seventh Day of March, 2000

Attest:

Attesting Officer

Q. TODD DICKINSON

Commissioner of Patents and Trademarks